(12) United States Patent
Lou et al.

(10) Patent No.: US 12,395,088 B2
(45) Date of Patent: Aug. 19, 2025

(54) INPUT RESPONSIVE PROTECTION AND FREQUENCY CONTROL OF SERIES CONNECTED CONVERTERS

(71) Applicant: Delta Electronics (Shanghai) Co., Ltd., Shanghai (CN)

(72) Inventors: Dehai Lou, Shanghai (CN); Pian Zhou, Shanghai (CN); Xin Wang, Shanghai (CN); Teng Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 234 days.

(21) Appl. No.: 17/900,505

(22) Filed: Aug. 31, 2022

(65) Prior Publication Data

US 2023/0073099 A1    Mar. 9, 2023

(30) Foreign Application Priority Data

Sep. 3, 2021    (CN) .......................... 202111031096.4

(51) Int. Cl.
*H02M 3/335*    (2006.01)
*H02M 1/00*    (2006.01)

(52) U.S. Cl.
CPC ..... *H02M 3/33584* (2013.01); *H02M 1/0074* (2021.05); *H02M 3/33573* (2021.05); *H02M 1/0035* (2021.05)

(58) Field of Classification Search
CPC .............................................. H02M 3/335–42
See application file for complete search history.

(56) References Cited

U.S. PATENT DOCUMENTS

| | | | |
|---|---|---|---|
| 10,848,066 B1 | 11/2020 | Yan et al. | |
| 2020/0295664 A1 | 9/2020 | Zhang et al. | |

FOREIGN PATENT DOCUMENTS

| | | |
|---|---|---|
| CN | 103812321 B | 8/2016 |
| CN | 106787628 B | 9/2019 |
| CN | 110601544 A | 12/2019 |

*Primary Examiner* — Peter M Novak
(74) *Attorney, Agent, or Firm* — KIRTON McCONKIE; Evan R. Witt (57) ABSTRACT

A power converter is provided. The power converter includes power units and local controller. Input terminals of the power units are connected to each other in series. Output terminals of the plurality of power units are connected to each other in parallel. The local controllers are electrically connected to the power units respectively. Each local controller controls an operation of switching devices in the corresponding power unit. Each local controller receives an input capacitor voltage on an input capacitor of the corresponding power unit, an input reference voltage and an output voltage of the power converter. In each power unit and the corresponding local controller, when an input difference between the input reference voltage and the input capacitor voltage is smaller than a first set value, the local controller controls a switching frequency of the switching devices in the corresponding power unit to jump to a preset frequency.

17 Claims, 7 Drawing Sheets

INPUT RESPONSIVE PROTECTION AND FREQUENCY CONTROL OF SERIES CONNECTED CONVERTERS

CROSS-REFERENCE TO RELATED APPLICATION

This application claims priority to China Patent Application No. 202111031096.4, filed on Sep. 3, 2021, the entire contents of which are incorporated herein by reference for all purposes.

FIELD OF THE INVENTION

The present disclosure relates to a power converter, and more particularly to a power converter and a control method thereof.

BACKGROUND OF THE INVENTION

In high-voltage DC/DC converter applications, ISOP (input-series-output-parallel) converters are widely used. The ISOP converter includes plural DC/DC modules with input terminals connected in series and output terminals connected in parallel. The difficulty of applying the ISOP converter is to realize the input voltage equalization control between the plural DC/DC modules.

The ISOP converter can utilize the power loop of the system to adjust the power of each DC/DC module, so as to realize the input voltage equalization. When the system works under heavy load, the adjusting ability of the power loop is strong, thus it is easy to realize the input voltage equalization. However, when the system works under light load, the adjusting ability of the power loop is limited, thus it is difficult to realize the input voltage equalization.

In addition, in order to improve the efficiency of converter, the DC/DC module is usually implemented with LLC resonant topology. When the system works under heavy load, the DC/DC module implemented with LLC resonant topology operates in frequency modulation mode. When the system works under light load, the DC/DC module operates in burst mode. Under this circumstance, the parasitic parameters of the DC/DC module make the gain curve oscillate and further cause non-monotonicity and instability of control.

SUMMARY OF THE INVENTION

The present disclosure provides a power converter and a control method thereof. When the voltage on the input capacitor of any power unit is too high or close to an input overvoltage protection point, the switching frequency of the power unit is adjusted immediately. Accordingly, the voltage on the input capacitor decreases rapidly, thus the overvoltage on the input capacitor is avoided, the components of the power converter is prevented from being damaged, and the power converter can keep working.

In accordance with an aspect of the present disclosure, a power converter is provided. The power converter includes a plurality of power units and a plurality of local controller. Each power unit includes an input capacitor. Input terminals of the plurality of power units are connected to each other in series. Output terminals of the plurality of power units are connected to each other in parallel. The plurality of local controllers are electrically connected to the plurality of power units respectively. Each local controller is configured to control an operation of switching devices in the corresponding power unit. Each local controller receives an input capacitor voltage on the input capacitor of the corresponding power unit, an input reference voltage and an output voltage of the power converter. In each power unit and the corresponding local controller, when an input difference between the input reference voltage and the input capacitor voltage is smaller than a first set value, the local controller controls a switching frequency of the switching devices in the corresponding power unit to jump to a preset frequency.

In accordance with another aspect of the present disclosure, a control method configured to control the power converter is provided. Regarding each power unit, the control method includes: receiving an input capacitor voltage on the input capacitor of the power unit, an input reference voltage, and an output voltage of the power converter; and when an input difference between the input reference voltage and the input capacitor voltage being smaller than a first set value, controlling a switching frequency of the switching devices in the power unit to jump to a preset frequency.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
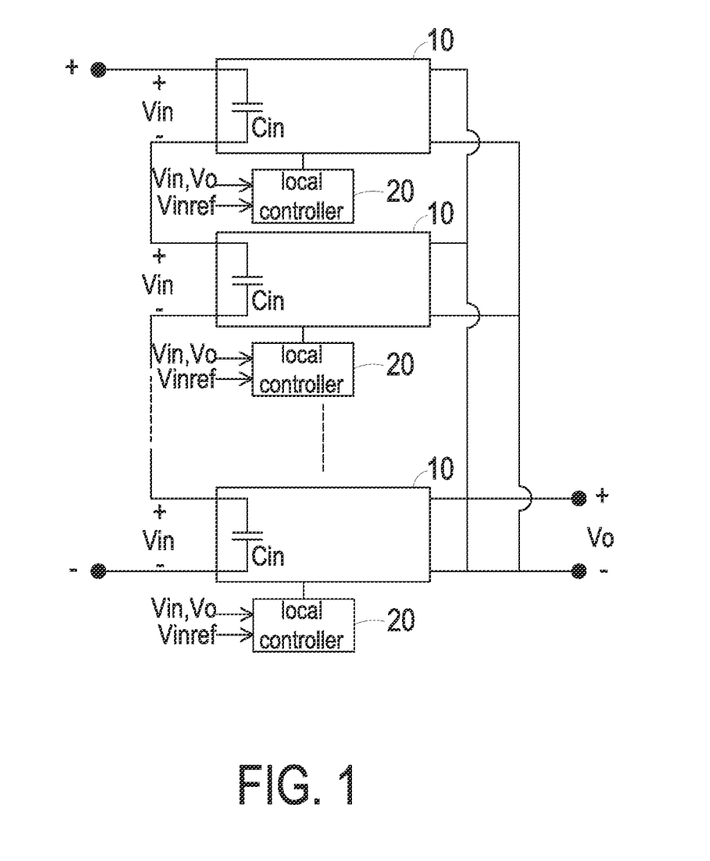
FIG. 1 is a schematic block diagram illustrating a power converter according to an embodiment of the present disclosure.

FIG. 1 is a schematic block diagram illustrating a power converter according to an embodiment of the present disclosure. As shown in FIG. 1, the power converter 1 of the present disclosure includes a plurality of power units 10 and a plurality of local controllers 20. Each power unit 10 includes an input capacitor Cin. The input terminals of all the power units 10 are connected to each other in series, and the output terminals of all the power units 10 are connected to each other in parallel. The plurality of local controllers 20 are electrically connected to the plurality of power units 10 respectively. That is, each local controller 20 is corresponding to one power unit 10, and each local controller 20 is configured to control the operation of switching devices in the corresponding power unit 10. Each local controller 20 receives an input capacitor voltage Vin on the input capacitor Cin of the corresponding power unit 10, an input reference voltage Vinref, and an output voltage Vo of the power converter 1. In each power unit 10 and the corresponding local controller 20, when an input difference ΔVin between the input reference voltage Vinref and the input capacitor voltage Vin (ΔVin=Vinref−Vin) is smaller than a first set value V1, the local controller 20 controls the switching frequency of the switching devices in the corresponding power unit 10 to jump to a preset frequency fsi.

In an embodiment, the input reference voltage Vinref may be set manually or may be a set value from another external controller.

Consequently, when the input capacitor voltage Vin of any power unit 10 is too high or close to an input overvoltage protection point, the switching frequency is adjusted immediately so that the input capacitor voltage Vin decreases rapidly. Accordingly, the input capacitor voltages Vin on the input capacitors Cin of the plurality of power units 10 are equalized, thus the overvoltage on the input capacitor Cin is avoided, the components of the power converter 1 is prevented from being damaged, and the power converter 1 can keep working.

Figure 2:
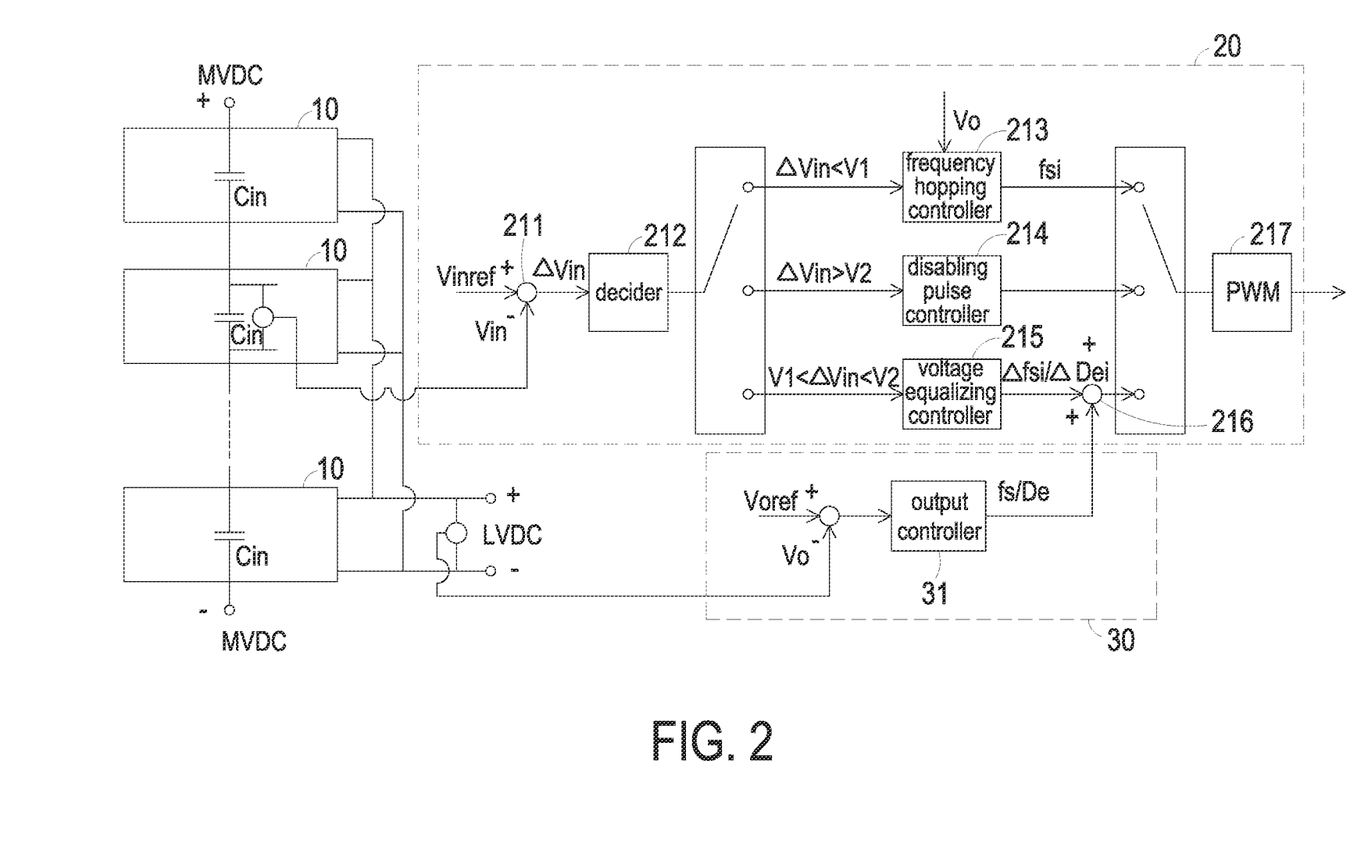
FIG. 2 schematically shows an output controller of the power converter and a local controller corresponding to one of the power units.

Please refer to FIG. 2. FIG. 2 schematically shows the local controller 20 corresponding to one of the power units 10 of the power converter 1. As shown in FIG. 2, each local controller 20 includes a calculator 211 and a decider 212. In each power unit 10 and the corresponding local controller 20, the calculator 211 receives the input capacitor voltage Vin and the input reference voltage Vinref, and calculates the input difference ΔVin by comparing the input reference voltage Vinref with the input capacitor voltage Vin. The decider 212 receives the input difference ΔVin and compares the input difference ΔVin with the first set value V1 and a second set value V2, where the first set value V1 is smaller than the second set value V2. In an embodiment, the first set value V1 may be the negative of the second set value V2 (i.e., V1=−V2). According to the magnitude relations between the input difference ΔVin and the first and second set values V1 and V2, the local controller 20 controls the power unit 10 correspondingly (e.g., the different controls taken by the local controller 20 are switched through the switch shown in the figure, but not exclusively). Therefore, the voltage equalization between the input capacitors is realized, and the input overvoltage or undervoltage is prevented. The different controls taken by the local controller 20 are described in detail as follows.

In an embodiment, each local controller 20 further includes a frequency hopping controller 213. In each power unit 10 and the corresponding local controller 20, when the decider 212 determines that the input difference ΔVin is smaller than the first set value V1, the frequency hopping controller 213 generates the preset frequency fsi according to the output voltage Vo, and the local controller 20 controls the switching devices in the corresponding power unit 10 to operate at the preset frequency fsi. In an embodiment, a plurality of preset frequencies fsi corresponding to different output voltages Vo are preset in the frequency hopping controller 213, and the frequency hopping controller 213 generates the corresponding preset frequency fsi according to the magnitude of the output voltage Vo. In this embodiment, the plurality of preset frequencies fsi may be different. As an example, the higher the output voltage Vo is, the smaller the corresponding preset frequency fsi is. In another embodiment, the plurality of preset frequencies fsi may be the same. Since the input difference ΔVin being smaller than the first set value V1 means that the input capacitor voltage Vin is too high or close to an input overvoltage protection point, the switching devices are controlled to operate at a relatively low preset frequency fsi (e.g., 80-400 kHz) according to the output voltage Vo. Consequently, the input capacitor voltage Vin decreases rapidly, thereby avoiding the overvoltage occurring on the input capacitor. After the input capacitor voltage Vin returns to be within the normal range, the input voltage equalization control is performed.

In an embodiment, each local controller 20 further includes a disabling pulse controller 214. In each power unit 10 and the corresponding local controller 20, when the decider 212 determines that the input difference ΔVin is larger than the second set value V2, the disabling pulse controller 214 outputs a disabling pulse command. According to the disabling pulse command, the local controller 20 controls the switching devices in the corresponding power unit 10 to stop operating. Since the input difference ΔVin being larger than the second set value V2 means that the input capacitor voltage Vin is too low or close to an input undervoltage protection point, the driving for the switching devices is disabled according to the disabling pulse command, and the switching devices are controlled to stop operating. Consequently, the input undervoltage is avoided. After the input capacitor voltage Vin returns to be within the normal range, the input voltage equalization control is performed.

In an embodiment, the power converter 1 further includes an output controller 31. The output controller 31 is configured to receive the output signal, where the output signal may be the output voltage Vo or an output current. Further, the output controller 31 calculates a control base parameter according to a difference between an output reference signal and the output signal, where the output reference signal may be an output reference voltage Voref or an output reference current. FIG. 2 schematically shows the situation that the output signal and the output reference signal are the output voltage Vo and the output reference voltage Voref respectively. When the output controller 31 receives the output voltage Vo, the output controller 31 calculates the control base parameter according to a difference between the output reference voltage Voref and the output voltage Vo. The power converter 1 further includes a master controller 30 in communication with the plurality of local controllers 20. The output controller 31 may be a part of the master controller 30, but not limited thereto. In addition, each local controller 20 further includes a voltage equalizing controller 215 and an operator 216. In each power unit 10 and the corresponding local controller 20, when the decider 212 determines that the input difference ΔVin is larger than the first set value V1 and is smaller than the second set value V2, the decider 212 outputs the input difference ΔVin to the voltage equalizing controller 215, and the voltage equalizing controller 215 generates a comparing parameter according to the input difference ΔVin. The operator 216 receives the comparing parameter and the control base parameter and calculates a designated parameter accordingly, and the local controller 20 controls the switching devices in the corresponding power unit 10 to operate with the designated parameter. Since the input difference ΔVin being larger than the first set value V1 and smaller than the second set value V2 means that the input capacitor voltage Vin is within the normal range, the switching devices are controlled to operate with the designated parameter so as to equalize the input voltages. The type of the designated parameter varies with the work mode of the power converter 1, which would be described in detail as follow.

Figure 3:
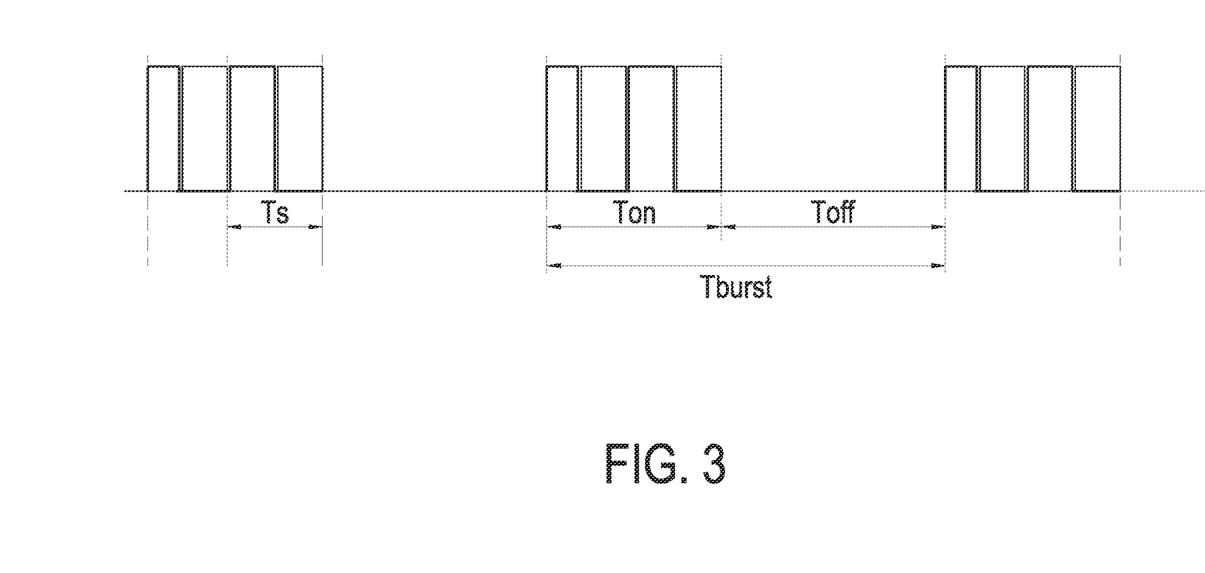
FIG. 3 schematically shows the operation of the burst mode.

The power unit 10 of the present disclosure is an isolated DC/DC converter and is usually implemented with LLC topology. Under the heavy load, the power converter 1 works in the frequency modulation mode. Correspondingly, the above-mentioned comparing parameter, control base parameter, and designated parameter are the comparing frequency Δfsi, the control base frequency fs, and the designated frequency respectively. When the load becomes lighter, the switching frequency of the switching devices in the power unit 10 increases correspondingly. As the switching frequency reaches the upper limit that the switching devices can bear, the power unit 10 can't be controlled through frequency modulation anymore. Under this circumstance, the power converter 1 changes to work in the burst mode, and the power converter 1 alternates between in operation for a period of time and out of operation for a period of time. As shown in FIG. 3, Ton is a time period of the power converter 1 being in a working state, Toff is a time period of the power converter 1 being in a non-working state, Ts is a switching cycle in the working state, Tburst is a working cycle in the burst mode, and the effective duty ratio Deff equals Ton/(Ton+Toff). Correspondingly, when the power converter 1 works in the burst mode, the above-mentioned comparing parameter, control base parameter, and designated parameter are the comparing duty ratio ΔDei, the control base duty ratio De, and the designated duty ratio respectively.

In addition, in an embodiment, as shown in FIG. 2, each local controller 20 further includes a PWM (pulse width modulation) generator 217. In each power unit 10 and the corresponding local controller 20, corresponding to the magnitude relations between the input difference ΔVin and the first and second set values V1 and V2, the PWM generator 217 generates the control signal according to the preset frequency fsi, the disabling pulse command or the designated parameter. The control signal is configured to control the operation of the switching devices in the corresponding power unit 10.

Figure 4:
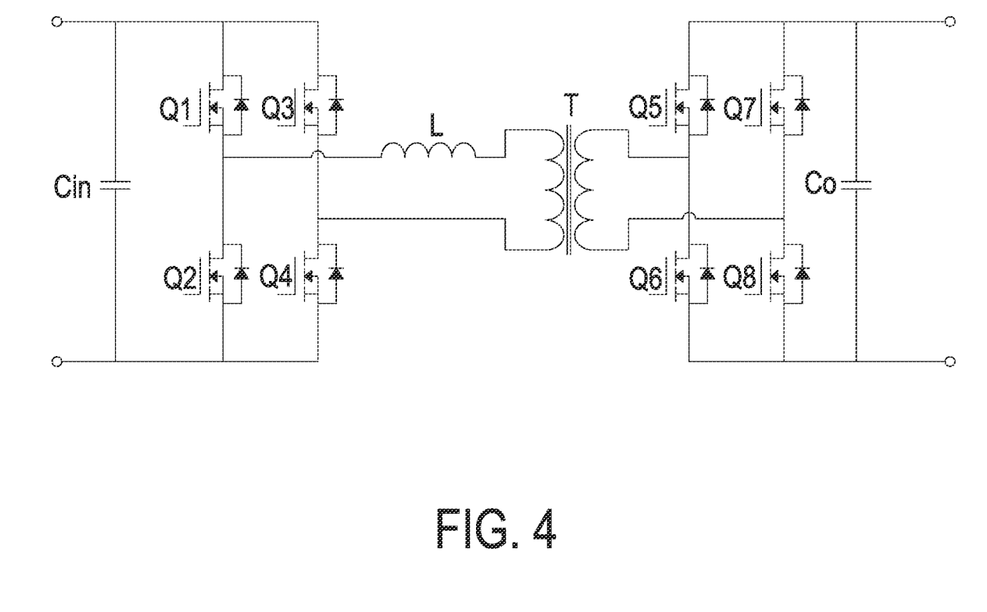
FIG. 4 is a schematic circuit diagram illustrating a dual-active-bridge bidirectional DC/DC converter.
Figure 5:
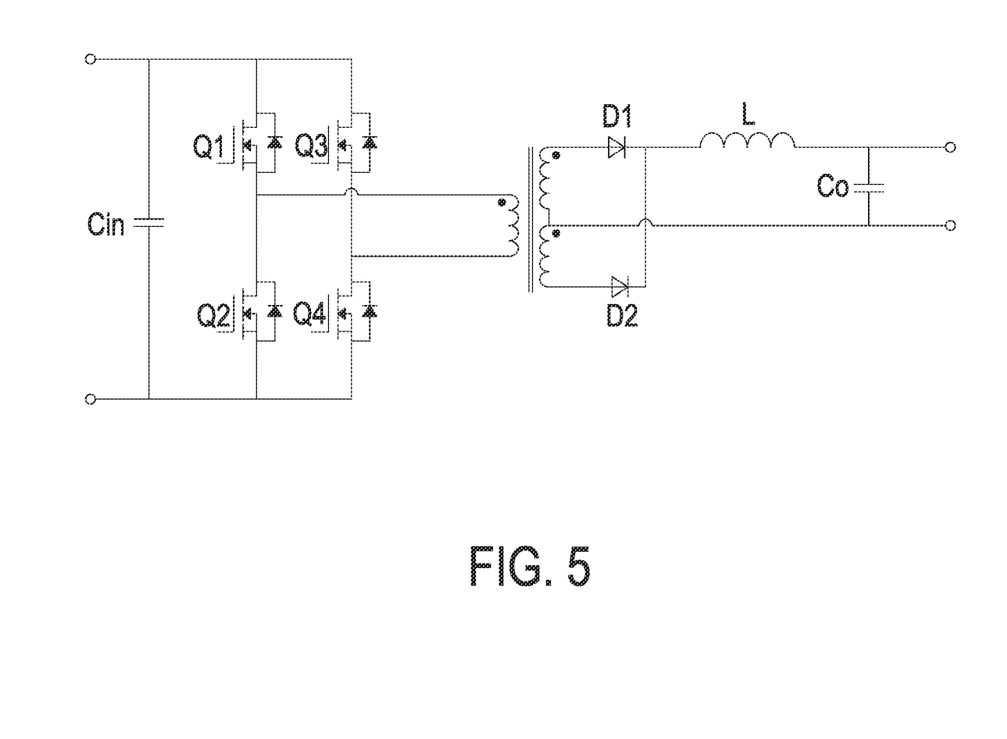
FIG. 5 is a schematic circuit diagram illustrating a full-bridge DC/DC converter.

Further, the power unit 10 is for example but not limited to include the dual-active-bridge bidirectional DC/DC converter shown in FIG. 4 or the full-bridge DC/DC converter shown in FIG. 5. As shown in FIG. 4, the dual-active-bridge bidirectional DC/DC converter includes a primary circuit, an inductor L, a transformer T, a secondary circuit, and an output capacitor Co. The primary circuit includes switching devices Q1 to Q4. The serially connected switching devices Q1 and Q2 are connected to the input capacitor Cin in parallel, and the serially connected switching devices Q3 and Q4 are connected to the input capacitor Cin in parallel. The inductor L and a primary winding of the transformer T are serially connected between a connection node of the switching devices Q1 and Q2 and a connection node of the switching devices Q3 and Q4. The secondary circuit includes switching devices Q5 to Q8. The serially connected switching devices Q5 and Q6 are connected to the output capacitor Co in parallel, and the serially connected switching devices Q7 and Q8 are connected to the output capacitor Co in parallel. A secondary winding of the transformer T is connected between a connection node of the switching devices Q5 and Q6 and a connection node of the switching devices Q7 and Q8. The above-mentioned local controller 20 is configured to control the operation of the switching devices Q1 to Q8. As shown in FIG. 5, the full-bridge DC/DC converter includes a primary circuit, a transformer, a secondary circuit, an inductor L, and an output capacitor Co. The primary circuit includes switching devices Q1 to Q4. The serially connected switching devices Q1 and Q2 are connected to the input capacitor Cin in parallel, and the serially connected switching devices Q3 and Q4 are connected to the input capacitor Cin in parallel. A primary winding of the transformer is connected between a connection node of the switching devices Q1 and Q2 and a connection node of the switching devices Q3 and Q4 in series. The secondary circuit includes diodes D1 and D2. An anode of the diode D1 is connected to a first terminal of a secondary winding of the transformer, an anode of the diode D2 is connected to a second terminal of the secondary winding of the transformer, and a cathode of the diode D2 is connected to a cathode of the diode D1. The inductor L is connected between the cathode of the diode D1 and one terminal of the output capacitor Co, and the central point of the secondary winding of the transformer is connected to the other terminal of the output capacitor Co. The above-mentioned local controller 20 is configured to control the operation of the switching devices Q1 to Q4.

Figure 6:
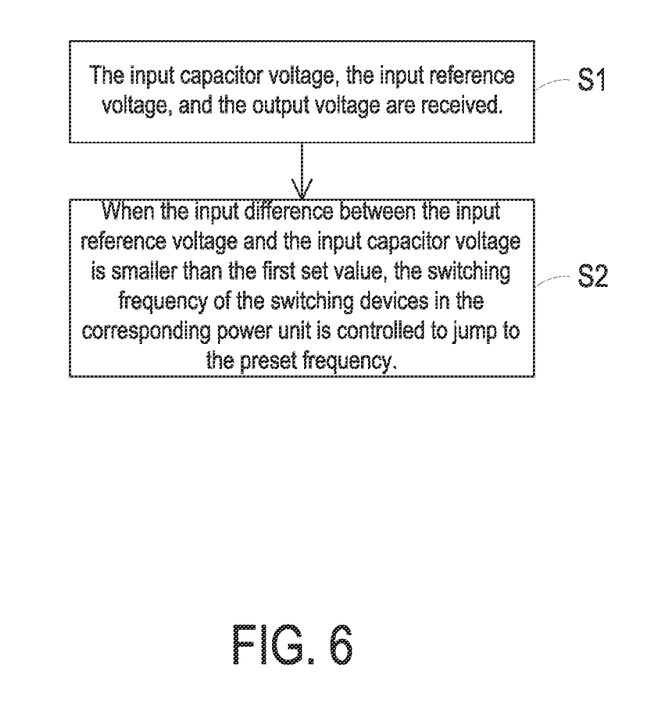
FIG. 6 and FIG. 7 are schematic flow charts illustrating a control method according to an embodiment of the present disclosure.

FIG. 6 is a schematic flow chart illustrating a control method according to an embodiment of the present disclosure. The control method is configured to control the power converter 1 stated above. Regarding each power unit 10, as shown in FIG. 6, the control method includes steps S1 and S2. In the step S1, the input capacitor voltage Vin of the power unit 10, the input reference voltage Vinref, and the output voltage Vo of the power converter 1 are received. In the step S2, when the input difference ΔVin between the input reference voltage Vinref and the input capacitor voltage Vin is smaller than the first set value V1, the switching frequency of the switching devices in the corresponding power unit 10 is controlled to jump to the preset frequency fsi. Consequently, when the input capacitor voltage Vin of any power unit 10 is too high or close to an input overvoltage protection point, the switching frequency is adjusted immediately so that the input capacitor voltage Vin decreases rapidly. Thus, the overvoltage on the input capacitor Cin is avoided, the components of the power converter 1 is prevented from being damaged, and the power converter 1 keeps working.

Figure 7:
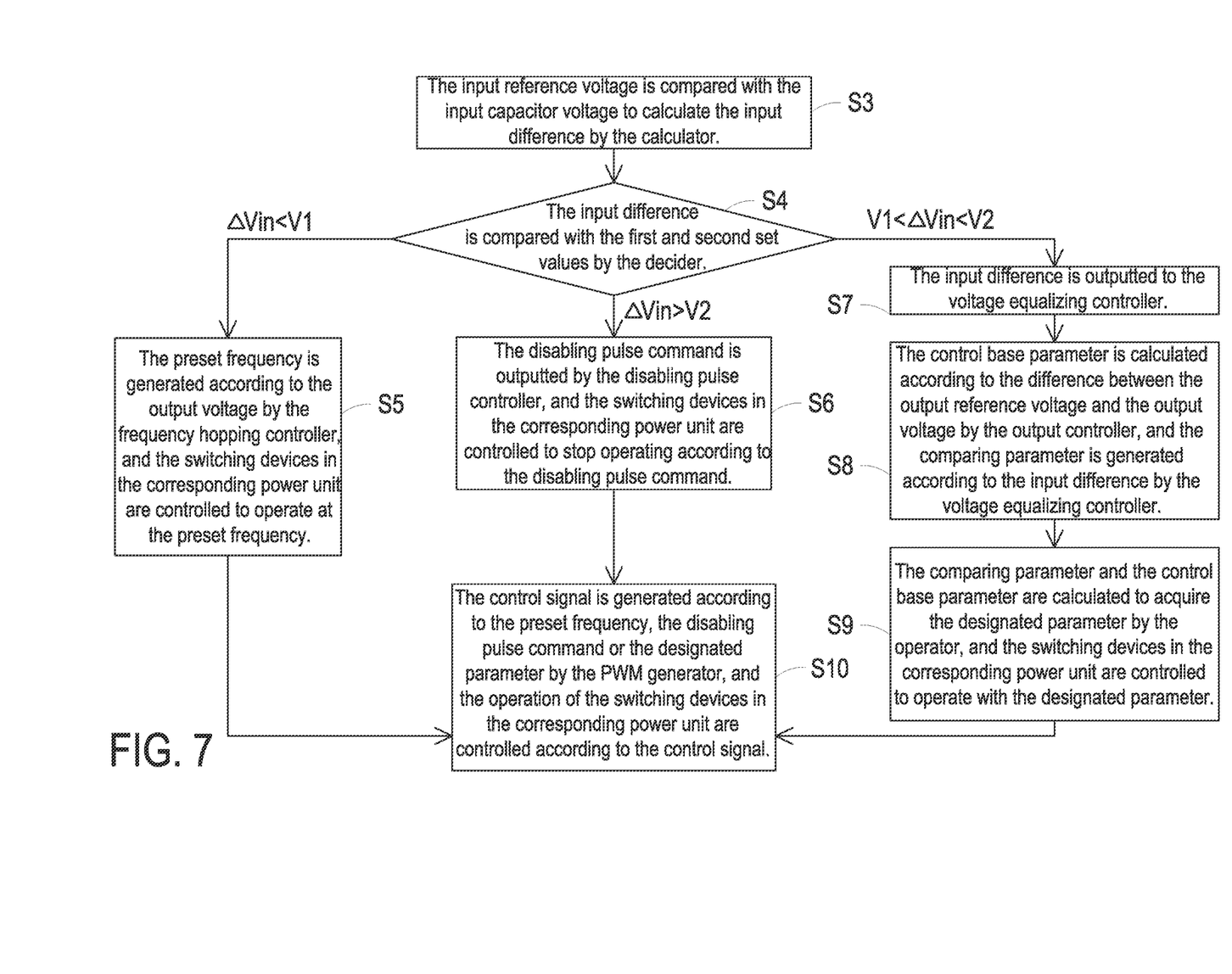

In an embodiment, the control method further includes the steps shown in FIG. 7. As shown in FIG. 7, firstly, in the step S3, the input reference voltage Vinref is compared with the input capacitor voltage Vin to calculate the input difference ΔVin by the calculator 211. Then, in the step S4, the input difference ΔVin is compared with the first and second set values V1 and V2 by the decider 212. Afterwards, according to the magnitude relations between the input difference ΔVin and the first and second set values V1 and V2, the power unit 10 is controlled correspondingly, so as to realize the input voltage equalization of the plurality of power units 10 and prevent the input overvoltage or undervoltage of each power unit 10, which would be described particularly as follows.

When the decider 212 determines that the input difference ΔVin is smaller than the first set value V1, the step S5 is performed. In the step S5, the preset frequency fsi is generated according to the output voltage Vo by the frequency hopping controller 213, and the switching devices in the corresponding power unit 10 are controlled to operate at the preset frequency fsi.

When the decider 212 determines that the input difference ΔVin is larger than the second set value V2, the step S6 is performed. In the step S6, the disabling pulse command is outputted by the disabling pulse controller 214, and the switching devices in the corresponding power unit 10 are controlled to stop operating according to the disabling pulse command.

When the decider 212 determines that the input difference ΔVin is larger than the first set value V1 and is smaller than the second set value V2, the step S7 is performed. In the step S7, the input difference ΔVin is outputted to the voltage equalizing controller 215. Then, in the step S8, the control base parameter is calculated according to the difference between the output reference voltage Voref and the output voltage Vo by the output controller 31, and the comparing parameter is generated according to the input difference ΔVin by the voltage equalizing controller 215. Afterwards, in the step S9, the comparing parameter and the control base parameter are calculated to acquire the designated parameter by the operator 216, and the switching devices in the corresponding power unit 10 are controlled to operate with the designated parameter.

In an embodiment, as shown in FIG. 7, the control method further includes a step S10. In the step S10, the control signal is generated according to the preset frequency fsi, the disabling pulse command or the designated parameter by the PWM generator 217, and the operation of the switching devices in the corresponding power unit 10 are controlled according to the control signal.

In summary, the present disclosure provides a power converter and a control method thereof. According to the magnitude relations between the input difference and the set values, the power unit is controlled correspondingly, so as to equalize the input voltages of the plurality of power units 10 and prevent the input overvoltage or undervoltage of each power unit 10. In particular, when the input capacitor voltage of any power unit is too high or close to an input overvoltage protection point, the switching frequency of the power unit is adjusted immediately. Accordingly, the input capacitor voltage decreases rapidly, thus the overvoltage on the input capacitor is avoided, the components of the power converter is prevented from being damaged, and the power converter keeps working. In addition, when the input capacitor voltage of any power unit is too low or close to an input undervoltage protection point, the switching devices are controlled to stop operating through disabling the driving therefor, so as to avoid the input undervoltage. Moreover, when the input capacitor voltage of any power unit is within the normal range, the switching devices are controlled to operate with the designated parameter, so as to equalize the input voltages. Further, the type of the designated parameter varies with the work mode of the power converter so that the input voltage equalization can be realized under both heavy load and light load.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
   a plurality of power units, wherein each of the plurality of power units comprises an input capacitor, input terminals of the plurality of power units are connected to each other in series, and output terminals of the plurality of power units are connected to each other in parallel; and
   a plurality of local controllers, electrically connected to the plurality of power units respectively, wherein each of the plurality of local controllers is configured to control an operation of switching devices in the corresponding power unit, each of the plurality of local controllers receives an input capacitor voltage on the input capacitor of the corresponding power unit, an input reference voltage and an output voltage of the power converter, wherein in each of the plurality of power units and the corresponding local controller, when an input difference between the input reference voltage and the input capacitor voltage is smaller than a first set value, the local controller controls a switching frequency of the switching devices in the corresponding power unit to jump to a preset frequency,
   wherein each of the plurality of local controllers comprises a calculator and a decider, in each of the plurality of power units and the corresponding local controller, the calculator receives the input capacitor voltage and the input reference voltage, and calculates the input difference by comparing the input reference voltage wi Input capacitor voltage, and the decider receives the input difference and compares the input difference with the first set value and a second set value, where the first set value is smaller than the second set value,
   wherein each of the plurality of local controllers further comprises a frequency hopping controller, in each of the plurality of power units and the corresponding local controller, when the decider determines that the input difference is smaller than the first set value, the frequency hopping controller generates the preset frequency according to the output voltage, and the local controller controls the switching devices in the corresponding power unit to operate at the preset frequency,
   wherein each of the plurality of local controllers further comprises a disabling pulse controller, in each of the plurality of power units and the corresponding local controller, when the decider determines that the input difference is larger than the second set value, the disabling pulse controller outputs a disabling polse command, and the local controller controls the switching devices in the corresponding power unit to stop operating accordingly.

2. The power converter according to claim 1, wherein each of the plurality of local controllers further comprises a PWM generator, in each of the plurality of power units and the corresponding local controller, the PWM generator generates a control signal according to the preset frequency, and the control signal is configured to control the operation of the switching devices in the corresponding power unit.

3. The power converter according to claim 1, wherein each of the plurality of local controllers further comprises a PWM generator, in each of the plurality of power units and the corresponding local controller, the PWM generator generates a control signal according to the disabling pulse command, and the control signal is configured to control the operation of the switching devices in the corresponding power unit.

4. The power converter according to claim 1, wherein the power unit comprises a full-bridge DC/DC converter or a dual-active-bridge bidirectional DC/DC converter.

5. The power converter according to claim 1, wherein a plurality of said preset frequencies corresponding to a plurality of said output voltages with different magnitude are preset in the frequency hopping controller, and the frequency hopping controller generates the corresponding preset frequency according to a magnitude of the output voltage.

6. The power converter according to claim 1, further comprising an output controller, wherein the output controller is configured to receive an output signal of the power converter and calculate a control base parameter according to a difference between the output signal and an output reference signal.

7. The power converter according to claim 6, wherein each of the plurality of local controllers further comprises a voltage equalizing controller and an operator, in each of the plurality of power units and the corresponding local controller, when the decider determines that the input difference is larger than the first set value and is smaller than the second set value, the decider outputs the input difference to the voltage equalizing controller, the voltage equalizing controller generates a comparing parameter according to the input difference, the operator receives the comparing parameter and the control base parameter and calculates a designated parameter accordingly, and the local controller controls the switching devices in the corresponding power unit to operate with the designated parameter.

8. The power converter according to claim 7, wherein when the power converter works in a frequency modulation mode, the comparing parameter, the control base parameter and the designated parameter are a comparing frequency, a control base frequency and a designated frequency respectively; wherein when the power converter works in a burst mode, the comparing parameter, the control base parameter and the designated parameter are a comparing duty ratio, a control base duty ratio and a designated duty ratio respectively.

9. The power converter according to claim 7, wherein each of the plurality of local controllers further comprises a PWM generator, in each of the plurality of power units and the corresponding local controller, the PWM generator generates a control signal according to the designated parameter, and the control signal is configured to control the operation of the switching devices in the corresponding power unit.

10. A control method configured to control a power converter, wherein the power converter comprises a plurality of power units and a plurality of local controllers, each of the plurality of power units comprises an input capacitor, input terminals of the plurality of power units are connected to each other in series, output terminals of the plurality of power units are connected to each other in parallel, the plurality of local controllers are electrically connected to the plurality of power units respectively, each of the plurality of local controllers is configured to control an operation of switching devices in the corresponding power unit, and regarding each of the plurality of power units, the control method comprises:
receiving an input capacitor voltage on the input capacitor of the power unit, an input reference voltage, and an output voltage of the power converter;
when an input difference between the input reference voltage and the input capacitor voltage being smaller than a first set value, controlling a switching frequency of the switching devices in the power unit to jump to a preset frequency; and
comparing the input reference voltage with the input capacitor voltage to calculate the input difference by a calculator, and comparing the input difference with the first set value and a second set value by a decider, wherein the first set value is smaller than the second set value;
when the decider determines that the input difference is smaller than the first set value, generating the preset frequency according to the output voltage by a frequency hopping controller, and controlling the switching devices in the corresponding power unit to operate at the preset frequency; and
when the decider determines that the input difference is larger than the second set value, outputting a disabling pulse command by a disabling pulse controller, and controlling the switching devices in the corresponding power unit to stop operating.

11. The control method according to claim 10, wherein a plurality of said preset frequencies corresponding to a plurality of said output voltages with different magnitude are preset in the frequency hopping controller, and the frequency hopping controller generates the corresponding preset frequency according to a magnitude of the output voltage.

12. The control method according to claim 10, wherein regarding each of the plurality of power units, the control method further comprises: generating a control signal according to the preset frequency by a PWM generator, and controlling the operation of the switching devices in the corresponding power unit according to the control signal.

13. The control method according to claim 10, wherein regarding each of the plurality of power units, the control method further comprises:
generating a control signal according to the disabling pulse command by a PWM generator, and controlling the operation of the switching devices in the corresponding power unit according to the control signal.

14. The control method according to claim 10, further comprising:
calculating a control base parameter according to a difference between an output signal of the power converter and an output reference signal by an output controller.

15. The control method according to claim 14, wherein regarding each of the plurality of power units, the control method further comprises:
when the decider determining that the input difference is larger than the first set value and is smaller than the second set value, outputting the input difference to a voltage equalizing controller;
generating a comparing parameter according to the input difference by the voltage equalizing controller; and
calculating a designated parameter according to the comparing parameter and the control base parameter by an operator, and controlling the switching devices in the corresponding power unit to operate with the designated parameter.

16. The control method according to claim 15, wherein when the power converter works in a frequency modulation mode, the comparing parameter, the control base parameter and the designated parameter are a comparing frequency, a control base frequency and a designated frequency respectively; wherein when the power converter works in a burst mode, the comparing parameter, the control base parameter and the designated parameter are a comparing duty ratio, a control base duty ratio and a designated duty ratio respectively.

17. The control method according to claim 15, wherein regarding each of the plurality of power units, the control method further comprises:
generating a control signal according to the designated parameter by a PWM generator, and controlling the operation of the switching devices in the corresponding power unit according to the control signal.

* * * * *